(12) United States Patent
Nagata et al.

(10) Patent No.: US 10,401,764 B2
(45) Date of Patent: Sep. 3, 2019

(54) CAM DRIVE DEVICE AND IMAGE FORMING APPARATUS INCORPORATING SAME

(71) Applicants: Haruki Nagata, Kanagawa (JP); Ryo Hasegawa, Kanagawa (JP); Atsushi Nagata, Kanagawa (JP); Kenji Honjoh, Kanagawa (JP)

(72) Inventors: Haruki Nagata, Kanagawa (JP); Ryo Hasegawa, Kanagawa (JP); Atsushi Nagata, Kanagawa (JP); Kenji Honjoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/832,900

(22) Filed: Dec. 6, 2017

(65) Prior Publication Data
US 2018/0164720 A1 Jun. 14, 2018

(30) Foreign Application Priority Data

Dec. 9, 2016 (JP) ................................ 2016-239467

(51) Int. Cl.
F16H 7/02 (2006.01)
F16H 25/14 (2006.01)
(Continued)

(52) U.S. Cl.
CPC ......... G03G 15/1675 (2013.01); F16H 7/023 (2013.01); F16H 25/14 (2013.01);
(Continued)

(58) Field of Classification Search
CPC .......... G03G 15/1675; G03G 15/1615; G03G 15/161; G03G 15/5004; G03G 15/167;
(Continued)

(56) References Cited

U.S. PATENT DOCUMENTS 5,531,580 A * 7/1996 Bonino .................... B29C 49/56
425/136
2008/0267650 A1* 10/2008 Kim ....................... G03G 15/657
399/68

(Continued)

FOREIGN PATENT DOCUMENTS

EP 1240431 A1 9/2002
EP 1426568 A1 6/2004
(Continued)

OTHER PUBLICATIONS

European Search Report dated May 11, 2018 issued in corresponding European Application No. 17205666.5.
(Continued)

Primary Examiner — Susan S Lee
(74) Attorney, Agent, or Firm — Harness, Dickey & Pierce, P.L.C.

(57) ABSTRACT

A cam drive device includes a cam to rotate; a displacement body to be displaced in response to a change in a rotation position of the cam in contact with the displacement body; a motor to rotate the cam; and a power source to output an electric current to be supplied to the motor. An electric current to cause a stall torque to the motor being a stop state is changed in response to a change in a rotation stop position of the cam.

17 Claims, 7 Drawing Sheets

(51) Int. Cl.
*G03G 15/00* (2006.01)
*G03G 15/16* (2006.01)

(52) U.S. Cl.
CPC ....... *G03G 15/161* (2013.01); *G03G 15/1615* (2013.01); *G03G 15/167* (2013.01); *G03G 15/5004* (2013.01); *G03G 2221/1657* (2013.01)

(58) Field of Classification Search
CPC .. G03G 2221/1657; F16H 7/023; F16H 25/14
USPC .......................................................... 399/318
See application file for complete search history.

(56) References Cited

U.S. PATENT DOCUMENTS

| | | |
|---|---|---|
| 2010/0014903 A1 | 1/2010 | Seto et al. |
| 2010/0247123 A1 | 9/2010 | Honjoh et al. |
| 2010/0310292 A1 | 12/2010 | Furukawa et al. |
| 2012/0141174 A1 | 6/2012 | Kurita et al. |
| 2013/0045031 A1 | 2/2013 | Nagata et al. |
| 2014/0270819 A1 | 9/2014 | Wada et al. |
| 2014/0314429 A1 | 10/2014 | Asano |
| 2014/0328604 A1 | 11/2014 | Tanaka et al. |
| 2015/0037054 A1 | 2/2015 | Nagata et al. |
| 2015/0346643 A1 | 12/2015 | Konishi et al. |
| 2015/0346651 A1 | 12/2015 | Nagata et al. |
| 2016/0091837 A1 | 3/2016 | Morita et al. |
| 2016/0103404 A1 | 4/2016 | Hasegawa |
| 2016/0139555 A1 | 5/2016 | Honjoh et al. |
| 2016/0154345 A1 | 6/2016 | Nagata et al. |
| 2016/0170363 A1 | 6/2016 | Kogure et al. |
| 2017/0108804 A1 | 4/2017 | Nagata |
| 2017/0235257 A1 | 8/2017 | Kochi et al. |
| 2017/0235258 A1 | 8/2017 | Wada et al. |
| 2017/0299987 A1 | 10/2017 | Sugimoto et al. |
| 2017/0299994 A1 | 10/2017 | Nagata et al. |
| 2017/0300000 A1 | 10/2017 | Nakamura et al. |

FOREIGN PATENT DOCUMENTS

| | | |
|---|---|---|
| JP | 2008096752 A * | 4/2008 |
| JP | 2009-031331 | 2/2009 |
| JP | 2010-085822 | 4/2010 |
| JP | 2014-071330 | 4/2014 |
| JP | 2015-135394 | 7/2015 |
| JP | 2015-219341 | 12/2015 |
| JP | 2015-225172 | 12/2015 |
| JP | 2016-109753 | 6/2016 |

OTHER PUBLICATIONS

Communication dated Feb. 14, 2019 by the European Patent Office for European Patent Application No. 17205666.5.

* cited by examiner

CAM DRIVE DEVICE AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application No. 2016-239467, filed on Dec. 9, 2016, in the Japan Patent Office, the entire disclosure of which is hereby incorporated by reference herein.

BACKGROUND

Technical Field

This disclosure generally relates to a cam drive device and an image forming apparatus, such as a copier, a printer, a facsimile machine, or a multifunction peripheral (MFP) having at least two of copying, printing, facsimile transmission, plotting, and scanning capabilities, that includes the cam drive device.

Description of the Related Art

There are cam drive devices that include a rotatable cam, a displacement body that changes the position thereof in response to changes in the rotation position of the cam in abutment with the displacement body, a motor as a driving source to rotate the cam, and a power source to output electric current to be supplied to the motor.

SUMMARY

According to an embodiment of this disclosure, a cam drive device includes a cam to rotate; a displacement body to be displaced in response to a change in a rotation position of the cam in contact with the displacement body; a motor to rotate the cam; and a power source to output an electric current to be supplied to the motor. An electric current to cause a stall torque to the motor being a stop state is changed in response to a change in a rotation stop position of the cam.

Another embodiment provides an image forming apparatus including an image forming device to form a toner image on a recording sheet, and the image forming device includes the cam drive device described above.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
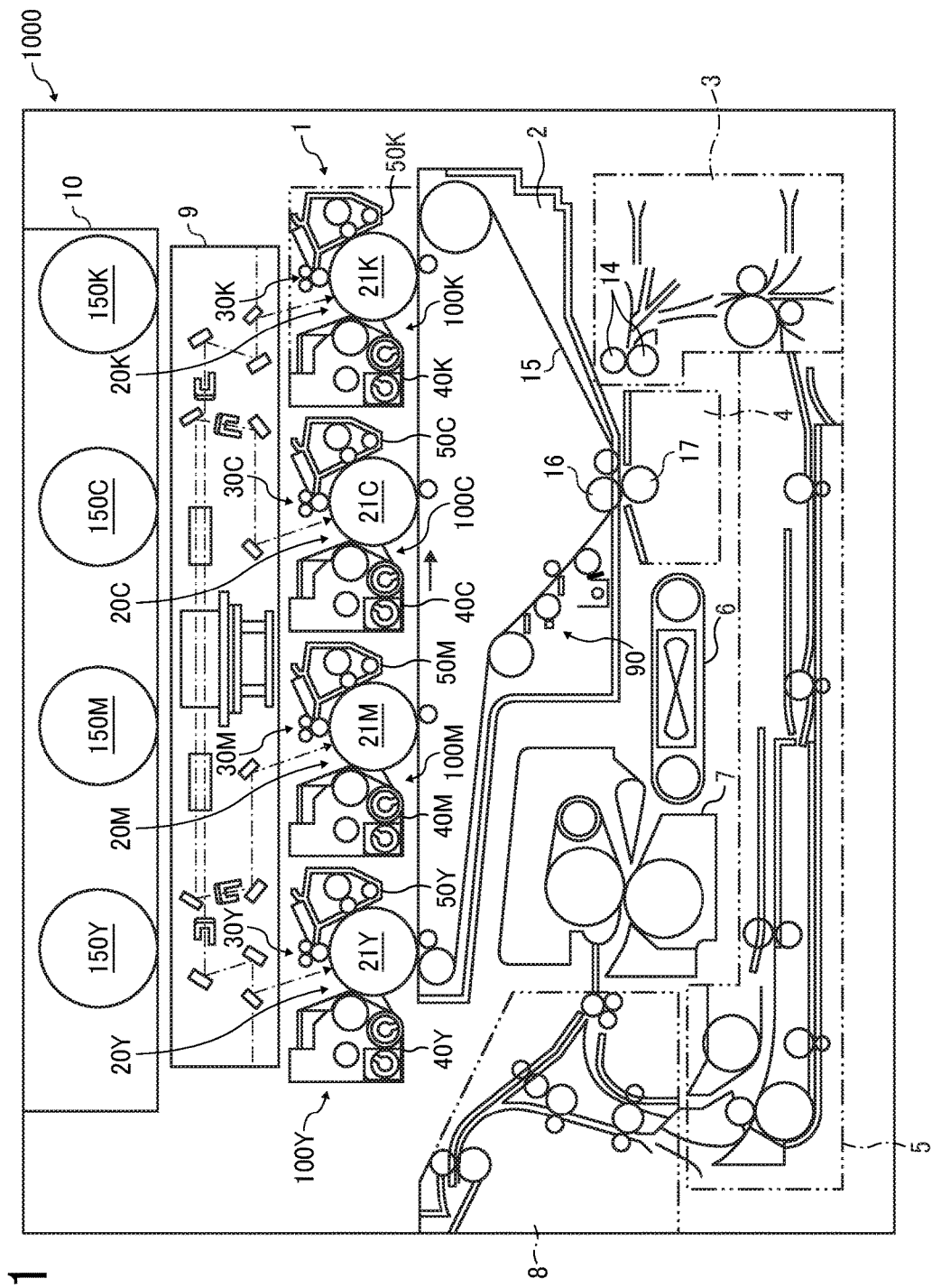
FIG. 1 is a schematic view of an image forming apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an embodiment of this disclosure is described. As used herein, the singular forms "a", "an", and "the" are intended to include the plural forms as well, unless the context clearly indicates otherwise.

Figure 2:
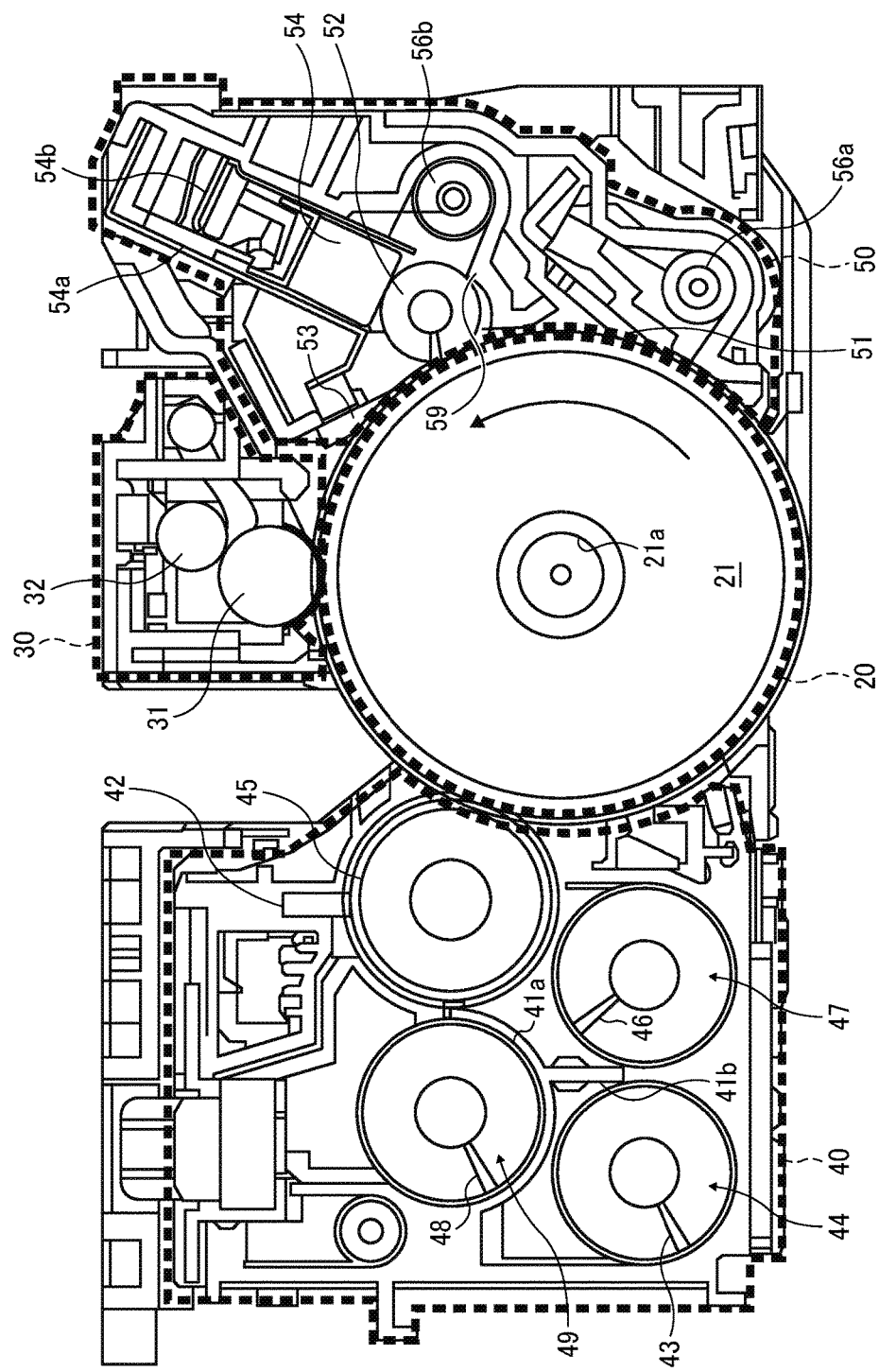
FIG. 2 is a schematic view of one of four photoconductor-developing units of the printer illustrated in FIG. 1.

Initially with reference to FIGS. 1 and 2, a description is given of an electrophotographic image forming apparatus according to an embodiment of this disclosure.

A basic configuration of the image forming apparatus, which in the present embodiment is a printer, for example, is described below. FIG. 1 is a schematic view of a printer 1000. The printer 1000 has a tandem unit 1 in which units 100Y, 100M, 100C, and 100K (i.e., photoconductor-developing units) for forming toner images of yellow (Y), magenta (M), cyan (C), and black (K) are aligned in parallel. The units 100Y, 100M, 100C, and 100K are configured such that four modules described below are supported by a common unit frame body. The four modules can be integrally attached to and detached from the printer 1000 body. The suffixes Y, M, C, and K indicating yellow, magenta, cyan, and black images, respectively, may be omitted when color discrimination is not necessary.

The first modules are photoconductor modules 20Y, 20M, 20C, and 20K respectively including drum-like photoconductors 21Y, 21M, 21C, 21K as latent image bearers. The second modules are charging modules 30Y, 30M, 30C, and 30K respectively including charging devices. The third modules are two-component developing devices 40Y, 40M, 40C, and 40K that perform development using developer containing toner and magnetic carrier. The fourth modules are cleaning modules 50Y, 50M, 50C, and 50K respectively including drum cleaning devices.

The photoconductor modules 20Y, 20M, 20C, and 20K, the charging modules 30Y, 30M, 30C, and 30K, the cleaning modules 50Y, 50M, 50C, and 50K are replaceable modules. The developing devices 40Y, 40M, 40C, and 40K are not replaceable in the present embodiment but can be configured as replaceable modules in another embodiment.

An exposure device 9 serving as a latent image forming device is disposed above the tandem unit 1. Disposed above the exposure device 9 is a bottle mount 10 that holds tonner bottles 150Y, 150M, 150C, and 150K containing yellow, magenta, cyan, and black toners to be supplied to the developing devices 40Y, 40M, 40C, and 40K.

The toner bottles 150Y, 150M, 150C, and 150K are removably attached to the bottle mount 10. When the toners in the tonner bottles 150Y, 150M, 150C, and 150K are used up, the tonner bottles 150Y, 150M, 150C, and 150K are removed from the bottle mount 10 and replaced with new ones.

Below the tandem unit 1, a transfer unit 2 including an intermediate transfer belt 15 as an image bearer is disposed. The intermediate transfer belt 15 is looped around multiple rollers and rotate clockwise in the drawings. The intermediate transfer belt 15 is an endless belt with single or multiple layers of materials such as polyvinylidene fluoride (PVDF), ethylene tetrafluoroethylene (ETFE), polyimide (PI), polycarbonate (PC), and the like. A conductive substance such as carbon black is dispersed in such materials to adjust the volume resistivity to $10^8$ to $10^{12}$ Ωcm and the surface resistivity to $10^9$ to $10^{13}$ Ω/sq. As necessary, the intermediate transfer belt 15 can include a release acceleration layer as a coat (a surface layer) on the front side of the loop thereof. The material for the coat can be a fluorine resin such as ethylene tetrafluoroethylene (ETFE), polytetrafluoroethylene (PTFE), polyvinylidene fluoride (PVDF), or perfluoro alkoxy (PEA) fluoroplastic. Alternatively, the material for the coat can be, but not be limited to, a fluoroplastic such as tetrafluoroethylene-hexafluoropropylene copolymer (FEP) or polyvinyl fluoride (PVF).

The method for manufacturing the intermediate transfer belt 15 can be casting, centrifugal molding, or the like. As necessary, the front surface of the intermediate transfer belt 15 can be polished. When the volume resistivity of the intermediate transfer belt 15 exceeds the above-mentioned range, the secondary transfer bias necessary for secondary transfer becomes too high, which leads to unfavorable increase in electric power cost. In this case, the intermediate transfer belt 15 has a high charge potential in the secondary transfer process and the recording sheet separation process, and self-discharge of the intermediate transfer belt 15 becomes difficult. Accordingly, the intermediate transfer belt 15 would need a static eliminator. When the volume resistivity and the surface resistivity fall below the above-mentioned ranges, the charge potential of the intermediate transfer belt 15 is more quickly attenuated, which is advantageous for static elimination by self-discharge. However, the electric current flows in a planar direction at the time of secondary transfer and undesirably promotes the scattering of toner. Accordingly, the volume resistivity and surface resistivity of the intermediate transfer belt 15 are desirably set within the above-mentioned ranges.

The volume resistivity and the surface resistivity are measured in such a way described below. Specifically, a high resistance resistivity meter (Hiresta produced by Mitsubishi Kasei Corporation) is coupled to an HRS probe (the inside electrode has a diameter of 5.9 mm and the ring electrode has an inner diameter of 11 mm), and a voltage of 100V (500V for measurement of the surface resistivity) to the front and back sides of the intermediate transfer belt 15. The measurement value after ten seconds from application of the voltage is used.

Below the transfer unit 2, a secondary transfer device 4 is disposed. The secondary transfer device 4 includes a secondary transfer roller 17 disposed in contact with an outer side of the intermediate transfer belt 15 and pressing against a secondary-transfer backup roller 16 via the intermediate transfer belt 15, thus forming a secondary transfer nip therebetween. A secondary transfer bias output from a secondary transfer power source is applied to the secondary transfer roller 17. By contrast, the secondary-transfer backup roller 16 is electrically grounded. Thus, a secondary transfer electrical field is generated in the secondary transfer nip.

In the printer 1000 according to the present embodiment, a combination of the transfer unit 2 and the secondary transfer device 4 acts as a transfer unit that transfers a toner image on the surface of the image bearer (the intermediate transfer belt 15) to a recording sheet sandwiched in the transfer nip (secondary transfer nip). The photoconductors 21Y, 21M, 21C, and 21K and the intermediate transfer belt 15 are driven at a process linear speed of 415 mm/s.

Additionally, a fixing device 7 is disposed on the left of the secondary transfer device 4 in FIG. 1 to fix toner images formed on sheets of recording media. The fixing device 7 includes a hearing roller inside which a heat generator is disposed. A conveyor belt 6 is disposed between the secondary transfer device 4 and the fixing device 7 and transports the sheet onto which a toner image is transferred to the fixing device 7. The printer 1000 further includes a sheet feeder 3 disposed in a lower section of the printer body for feeding sheets from a sheet container (i.e., a sheet tray) one by one to the secondary transfer device 4. An ejection unit 8 disposed on the left of the fixing device 7 in the drawing transports the sheet that has passed through the fixing device 7 either outside the apparatus or to the sheet reversal unit 5.

Four primary transfer rollers for yellow, magenta, cyan, and black are disposed inside the loop of the intermediate transfer belt 15. The primary transfer rollers sandwich the intermediate transfer belt 15 with the respective photoconductors 21Y, 21M, 21C, and 21K corresponding to the colors. Accordingly, the outer face (front side) of the intermediate transfer belt 15 contacts the photoconductors 21Y, 21M, 21C, and 21K, and the contact portions therebetween serve as primary transfer nips for yellow, magenta, cyan, and black, respectively. In the primary transfer nips, a primary transfer field is generated between the primary transfer rollers to which a primary transfer bias is applied and electrostatic latent images on the photoconductors 21Y, 21M, 21C, and 21K to electrostatically move the toner from the photoconductor side to the belt front side. The primary transfer bias opposite in polarity to the charging polarity of the toner is +1800 V, for example.

Upon receipt of image data from, e.g., an external personal computer, the printer 1000 starts a print job and starts driving the intermediate transfer belt 15 and the like. Then, in the tandem unit 1, the charging devices of the charging modules 30Y, 30M, 30C, and 30K evenly charge the surfaces of the photoconductors 21Y, 21M, 21C, and 21K, which rotate, to a predetermined charge potential. Electrostatic latent images for yellow, magenta, cyan, and black are formed on the surfaces of the evenly charged photoconductors 21Y, 21M, 21C, and 21K by optical scanning using laser beams for yellow, magenta, cyan, and black generated based on the image data and emitted from the exposure device 9. These electrostatic latent images are developed by the developing devices 40Y, 40M, 40C, and 40K into yellow, magenta, cyan, and black toner images, and are primarily transferred in sequence onto the intermediate transfer belt 15 and superimposed one on another, into a four-color toner image.

After the transfer of the toner images, the residual toner on the surfaces of the photoconductors 21Y, 21M, 21C, and 21K are removed from the surfaces of the photoconductors 21Y, 21M, 21C, and 21K by the drum cleaning devices in the cleaning modules 50Y, 50M, 50C, and 50K.

Along with the formation of the toner images, the recording sheets are fed from the sheet container below the sheet reversal unit, separated from each other and supplied to the sheet feeder 3, and get stuck between a registration roller pair 14 to be stopped. Then, the registration roller pair 14 starts rotating at the timing when the multicolor toner image on the intermediate transfer belt 15 reaches the secondary transfer nip. Along with the start of the rotation, the recording sheet is conveyed again in synchronization with the multicolor toner image on the intermediate transfer belt 15 in the secondary transfer nip, and the multicolor toner image is secondarily transferred to the surface of the recording sheet. Thus, a multicolor toner image is formed on the recording sheet. The recording sheet after the transfer of the toner image is fed by the conveyor belt 6 into the fixing device 7. The fixing device 7 applies heat and pressure thereto to fix the multicolor image on the surface of the recording sheet. After that, the recording sheet is fed to the ejection unit 8.

In the ejection unit 8, the path of the recording sheet is switched between a sheet ejection tray outside the apparatus (the left side of the apparatus) and the sheet reversal unit 5 below by the operation of a switch pawl. The sheet reversal unit 5 sends the recording sheet back to the secondary transfer nip while vertically reversing the recording sheet. The recording sheet is sent back to the secondary transfer nip so that the toner image is secondarily transferred to the back side of the sheet. After that, the recording sheet is ejected to the sheet ejection tray by the ejection unit 8. After the intermediate transfer belt 15 passes through the secondary transfer nip, an intermediate transfer belt cleaning unit 90 removes residual toner from the surface of the intermediate transfer belt 15.

The yellow, magenta, cyan, and black units 100Y, 100M, 100C, and 100K are almost identical in configuration except for the color of the toner. Accordingly, one of the photoconductor-developing units will be described below with omission of reference signs indicating yellow, magenta, cyan, and black.

FIG. 2 is a schematic view of one of the four units 100Y, 100M, 100C, and 100K. Referring to FIG. 2, while the photoconductor 21 rotates counterclockwise in the drawing, the surface of the photoconductor 21 is evenly charged by a charging roller 31 of the charging module 30. The charging module 30 is a disposed in contact with (contact type) or contactlessly disposed adjacent to the surface of the photoconductor 21 to charge evenly the surface of the photoconductor 21 using the charging roller 31 as a charger to which a charging bias from the power source is applied.

An electrostatic latent image is formed on the evenly charged surface of the photoconductor 21 by optical scanning using a laser beam emitted from the exposure device 9 and is developed by the developing device 40. The developing device 40 includes a cylindrical developing sleeve that is a non-magnetic body to rotate clockwise in the drawing and a roller-like magnetic body that is disposed inside the developing sleeve not to rotate together with the developing sleeve. The magnetic body includes a plurality of magnetic poles arranged in the circumferential direction (i.e., the direction of arc). The developing sleeve bears on its surface two-component developer including the magnetic carrier and the toner contained in the developer container by a magnetic force generated by a scooping magnetic pole in the magnetic body, and conveys by rotation the developer to a developing range opposed to the photoconductor 21. In the developing range, the toner of the developer moves from the surface of the magnetic carrier to the electrostatic latent image on the photoconductor 21. Then, the electrostatic latent image is developed into a toner image on the surface of the photoconductor 21.

The developing device 40 includes a supply screw 48 as a supply conveyor that conveys by rotation the developer in the axial direction thereof, from the back side to the front side in the direction orthogonal to the plane on which the drawing is illustrated, and supplies the developer to the developing roller 45. Around the developing roller 45, a doctor blade 42 is disposed downstream from a portion where the developing roller 45 faces the supply screw 48 in the direction of rotation of the developing sleeve. The doctor blade 42 serves as a developer regulator to adjust the amount of developer supplied to the developing roller 45 to a desired or given layer thickness. Further, a collecting compartment 47 is located downstream, in the direction of rotation of the developing roller 45, from the developing range where the developing roller 45 opposes the photoconductor 21. Into the collecting compartment 47, the developer that has passed through the developing range (i.e., developer having been used in developing) and left the developing sleeve is collected. In the collecting compartment 47, a collecting screw 46 is disposed. The collecting screw 46 transports the developer, along the axial direction thereof, in the direction identical to the direction in which the supply screw 48 transports the developer (hereinafter "developer conveyance direction"). The developing roller 45 and a supply compartment 49, in which the supply screw 48 is disposed, are arranged laterally. The collecting compartment 47, in which the collecting screw 46 is disposed, is positioned below the developing roller 45.

The developing device 40 includes a stirring compartment 44 on a side of the collecting compartment 47. The stirring compartment 44 includes a stirring screw 43 that conveys the developer from the front side to the back side in the direction penetrating the drawing, in the direction opposite to the direction of conveyance by the supply screw 48, while stirring the developer along the axial direction of the developing sleeve of the developing roller 45.

The supply compartment 49 is separated, at least partly, from the stirring compartment 44 by a first partition 41a. The first partition 41a has openings in the end portions on the front side and the back side in the direction penetrating the drawing to let the supply compartment 49 and the stirring compartment 44 communicate with each other. Note that the supply compartment 49 and the collecting compartment 47 are separated by the first partition 41a as well, and no opening is in that portion of the first partition 41a. Thus, the supply compartment 49 does not communicate with the collecting compartment 47. The second partition 41b separates the stirring compartment 44 from the collecting compartment 47. The second partition 41b has an opening in the end portion on the front side in the direction penetrating the drawing to let the stirring compartment 44 and the collecting compartment 47 communicate with each other.

Above the developing roller 45, the doctor blade 42 made of, for example, stainless steel, is disposed. The doctor blade 42 has a tip opposed to the surface of the developing sleeve with a predetermined doctor gap secured therebetween, to restrict the layer thickness of the developer borne on the developing sleeve to a predetermined thickness.

The developer collected in the collecting compartment 47 is conveyed from the back side to the front side in the direction penetrating the drawing. Then, a toner concentration sensor, which is a magnetic permeability sensor, detects the concentration of toner at the end portion of the collecting compartment 47 on the front side of the plane on which the drawing is illustrated. After that, the toner enters the stirring compartment 44 through the opening in the second partition 41b, and is mixed with fresh toner supplied from a toner supply inlet in the casing of the developing device 40. The amount of toner to be supplied is decided according to the concentration of toner detected in advance in the collecting compartment 47.

In the supply compartment 49, a portion of the developer conveyed from the back side to the front side in the direction penetrating the drawing by the supply screw 48 is scooped up to the surface of the developing sleeve of the developing roller 45. The excess developer not scooped up to the developing sleeve but conveyed to the end portion of the supply compartment 49 on the front side in the direction penetrating the drawing enters the stirring compartment 44 through an excess opening 92 of the first partition 41a. Meanwhile, the developer scooped up to the developing sleeve contributes to development in the developing range, and then is separated from the surface of the developing sleeve and returned to the collecting compartment 47. After that, the developer is conveyed by the collecting screw 46 to the end portion of the collecting compartment 47 on the front side in the direction penetrating the drawing, and the developer enters the stirring compartment 44 through a collection opening 93 in the second partition 41b.

In the stirring compartment 44, the excess developer and the collected developer are conveyed by the stirring screw 43 from the front side to the back side in the direction penetrating the drawing, and then enter the supply compartment 49 through a supply opening 91 in the first partition 41a at the end on the back side.

The toner image formed on the surface of the photoconductor 21 by the development using the developing device 40 is transferred onto the intermediate transfer belt 15. After the transfer of the toner image, a cleaning blade 51 of the cleaning module 50 removes the residual toner from the surface of the photoconductor 21.

The cleaning module 50 includes the cleaning blade 51 disposed with a free end in abutment (contact) with the photoconductor 21 for scraping off residual toner, a solid lubricant 54 formed by solidifying a lubricant containing at least boron nitride and zinc stearate, and the like. The cleaning module 50 further includes a lubricant application brush 52 for applying powdery lubricant shaved off the solid lubricant 54 to the surface of the photoconductor 21, a leveling blade 53 to level the lubricant applied to the surface of the photoconductor 21. The cleaning blade 51, the lubricant application brush 52, and the leveling blade 53 are arranged in this order from the upstream side in the direction of rotation of the photoconductor.

Figure 3A:
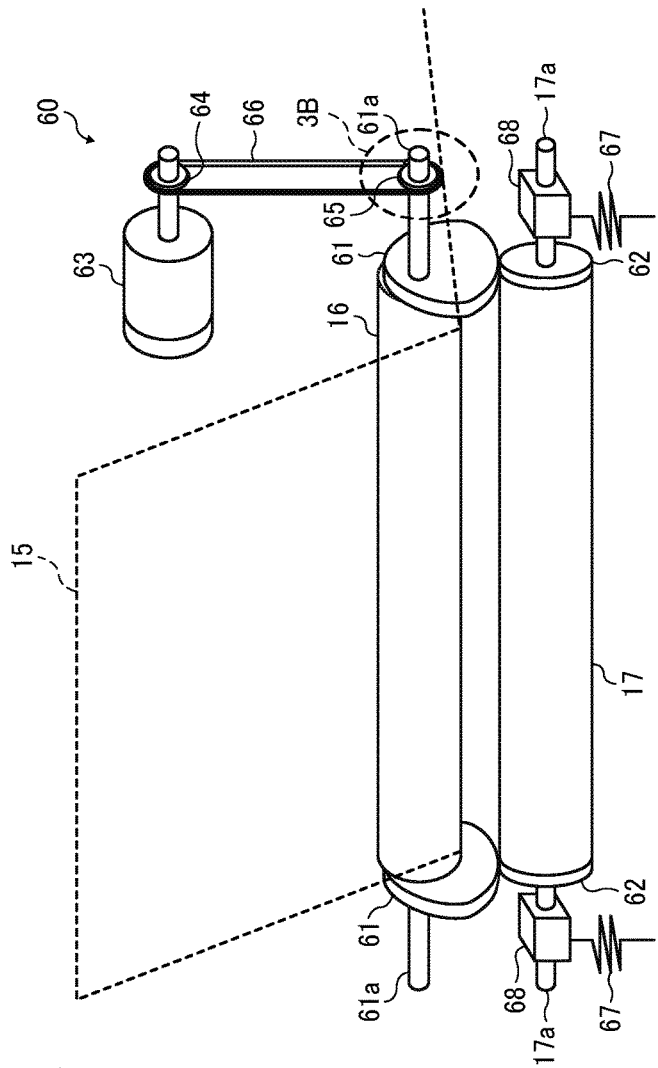
FIG. 3A is a perspective view of a contact-separation mechanism to contact and separate a secondary transfer roller from an intermediate transfer belt in the printer illustrated in FIG. 1.
Figure 3B:
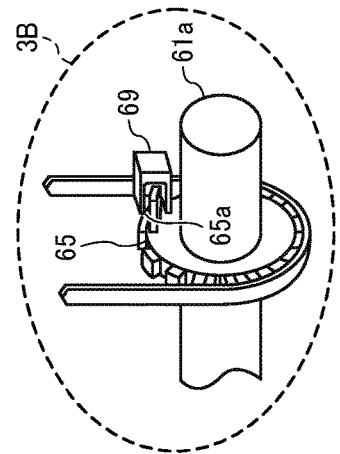
FIG. 3B is an enlarge view of a portion illustrated in FIG. 3A.

FIG. 3A is a perspective view of a contact-separation mechanism 60 that causes the intermediate transfer belt 15 to contact and separate from the secondary transfer roller 17. FIG. 3B is an enlarged view of a portion of the contact-separation mechanism 60. The secondary transfer roller 17 opposes the secondary-transfer backup roller 16 such that the secondary transfer roller 17 is on the lower side and the secondary-transfer backup roller 16 is on the upper side with the intermediate transfer belt 15 interposed therebetween.

The secondary transfer roller 17 is biased toward the secondary-transfer backup roller 16 by springs 67 as biasing members. Alternatively, the biasing member can be a sponge to exert elasticity or a solenoid to exert an electromagnetic force.

The intermediate transfer belt 15 and the secondary transfer roller 17 can freely contact and separate from each other within a specific range by the contact-separation mechanism 60 including a stepping motor 63, eccentric cams 61, and the like. The eccentric cam 61 is disposed coaxially to the secondary-transfer backup roller 16 on the either axial side of the secondary-transfer backup roller 16.

The two eccentric cams 61 are attached to a cam shaft 61a and coupled together thereby. The cam shaft 61a penetrates a through hole in the rotation center of the secondary-transfer backup roller 16. The eccentric cams 61 rotate around the cam shaft 61a. Specifically, one of the eccentric cams 61 rotates at a position outward of one end of the secondary-transfer backup roller 16 in the axial direction, and the other eccentric cam 61 rotates at a position outward of the other end of the secondary-transfer backup roller 16 in the axial direction.

The cam shaft 61a supports the secondary-transfer backup roller 16 to allow the secondary-transfer backup roller 16 to rotate idle on the circumferential surface of the cam shaft 61a. As the intermediate transfer belt 15 looped around a portion of the peripheral surface of the secondary-transfer backup roller 16 rotates (moves endlessly), the secondary-transfer backup roller 16 rotates.

From both end faces of the secondary transfer roller 17 in the direction of rotation axis thereof, a rotation shaft 17a protrudes. Specifically, the rotation shaft 17a protrudes at the center of rotation the secondary transfer roller 17. The rotation shaft 17a is rotatably received by the bearings 68 and rotates together with the roller portion of the secondary transfer roller 17.

Each end of the rotation shaft 17a penetrates a ball bearing 62 disposed on either side of the secondary transfer roller 17 in the axial direction. The ball bearings 62 are disposed not to rotate together with the rotation shaft 17a. Depending on the rotation stop position of the cam shaft 61a, a portion of the eccentric cam 61 having a relatively large radius of curvature abuts against the ball bearing 62 to form a gap between the intermediate transfer belt 15 and the secondary transfer roller 17.

To the cam shaft 61a, a cam gear 65 is secured. A motor gear 64 is secured to the motor shaft of the stepping motor 63. Around the cam gear 65 and the motor gear 64, a timing belt 66 is looped. Rotation of the stepping motor 63 is controllable at a step angle of 1.8°. As the stepping motor 63 rotates, the rotational driving force is propagated to the cam gear 65 via the timing belt 66, and the two eccentric cams 61 secured to the cam shaft 61a rotate in the same phase. To ensure the rotation in the same phase, the eccentric cams 61 are fitted in D-cut grooves in the cam shaft 61a and attached to the cam shaft 61a.

A radius of a smallest radius portion of the eccentric cam 61 (in which the distance between the center of rotation of the eccentric cam 61 and the circumference is shortest) is shorter than the radius of the secondary-transfer backup roller 16. When the eccentric cams 61 stop rotation with those portions facing the ball bearings 62, the eccentric cams 61 do not abut on the ball bearings 62. Accordingly, the eccentric cams 61 do not exert a force to move the secondary transfer roller 17 away from the intermediate transfer belt 15. Accordingly, the secondary transfer roller 17 is pressed against the intermediate transfer belt 15 by the biasing force of the springs 67 to form the second transfer nip.

A radius of a largest radius portion of the eccentric cam 61 (in which the distance between the rotation center and the circumference is longest) is longer than the radius of the secondary-transfer backup roller 16. As illustrated in the drawing, when the eccentric cams 61 stop rotation with those portions facing the ball bearings 62, the eccentric cams 61 abut on the ball bearings 62 and exert the force to move the ball bearings 62 away from the intermediate transfer belt 15. Accordingly, the secondary transfer roller 17 separates from the intermediate transfer belt 15 and does not form the second transfer nip.

At a predetermined position in the direction of circumference (direction of arc) of the cam gear 65, a reference projection 65a protrudes from a side face of the cam gear 65. On a lateral side of the cam gear 65, a rotation position sensor 69, such as a transmissive optical sensor, is disposed. When the cam gear 65 is at a reference rotation position (i.e., a predetermined rotation position), the reference projection 65a of the cam gear 65 enters between a light emitting element and a light receiving element of the rotation position sensor 69. Since the cam gear 65 and the eccentric cams 61 rotate integrally (as one unit), the rotation position sensor 69 detects the reference projection 65a to detect that the eccentric cams 61 are at the predetermined reference rotation positions. At the timing of detection, the rotation position sensor 69 outputs a reference detection signal to a controller 200 described later.

Figure 4:
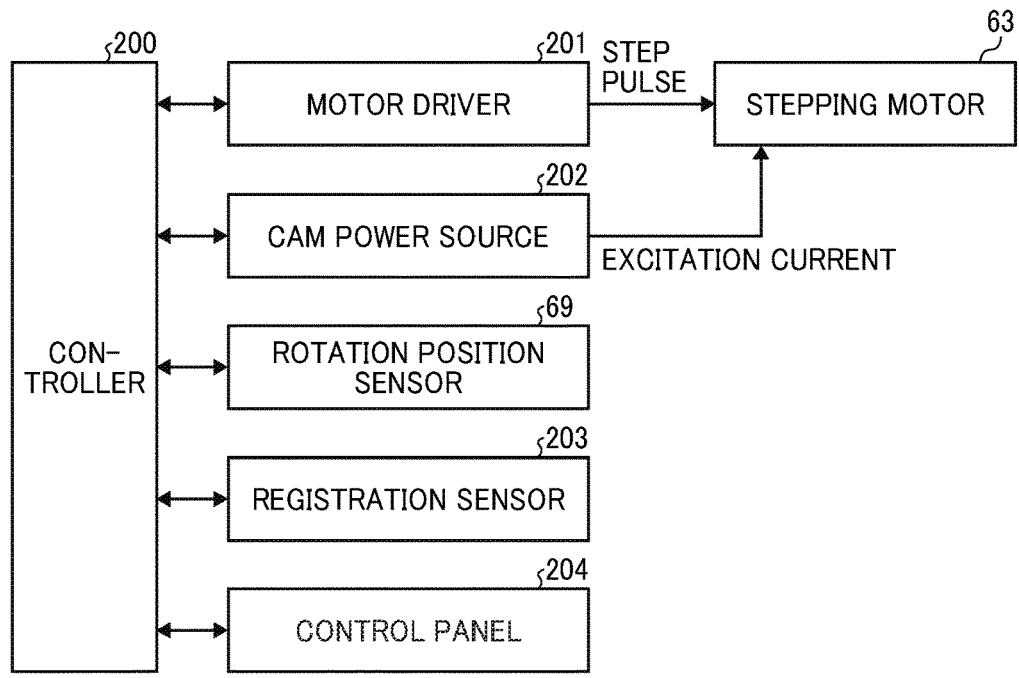
FIG. 4 is a block diagram illustrating electrical circuitry of the printer illustrated in FIG. 1.

FIG. 4 is a block diagram illustrating electrical circuitry of the printer 1000 according to the present embodiment. Referring to FIG. 4, the controller 200 controls driving of the devices in the printer 1000 and performs various arithmetic operations. The controller 200 can include a processor including a central processing unit (CPU) and associated memory units such as a read only memory (ROM), a random access memory (RAM), etc. Although the controller 200 is connected to various electric devices, FIG. 4 illustrates only major ones of those electric devices.

A motor driver 201 controls driving of the stepping motor 63. The motor driver 201 controls the number of step pulses to be transmitted to the stepping motor 63, to adjust finely the rotation angle of the stepping motor 63. The stepping motor 63 is in a stop state when the motor driver 201 does not transmit the step pulse to the stepping motor 63. At that time, receiving an excitation current, the stepping motor 63 magnetically retains the motor shaft, thereby preventing idle running.

In response to a control signal (e.g., a motor drive signal) issued from the controller 200, for rotating the stepping motor 63 at a predetermined rotation angle, the motor driver 201 transmits a number of step pulses corresponding to the control signal to the stepping motor 63. Accordingly, the stepping motor 63 rotates by the predetermined rotation angle, and the eccentric cams 61 rotate by the predetermined rotation angle. By performing the control described above, the controller 200 can adjust freely the rotation stop position of the eccentric cams 61.

A cam power source 202 outputs current to be supplied to the stepping motor 63. When the main power supply to the printer 1000 is turned off and the cam power source 202 outputs no current, the motor shaft of the stepping motor 63 may rotate idle slightly due to vibration or the like. The reference projection 65a and the rotation position sensor 69 are provided to detect correctly the rotation position of the eccentric cams 61 even in the event of such idling.

Immediately after the main power supply to the printer 1000 is turned on, the controller 200 performs a process to detect the rotation position of the eccentric cams 61. In this process, the controller 200 waits for the timing of transmission of the reference detection signal from the rotation position sensor 69 (reference rotation position timing) while transmitting the motor drive signal to the motor driver 201 to drive the stepping motor 63. Then, when the reference rotation position timing has come, the controller 200 sends the motor driver 201 a signal for rotating the stepping motor 63 just one turn. Accordingly, the eccentric cams 61 stop rotation at the reference rotation stop position. After that, the controller 200 determines the rotation position of the eccentric cams 61 based on the accumulation of the angles by which the eccentric cams 61 has rotated according to the control signal transmitted from the controller 200 to the motor driver 201.

In the foregoing description, for the ease of understanding, the recording sheet is fed from the registration roller pair 14 to the secondary transfer nip. To be exact, the controller 200 separates the intermediate transfer belt 15 and the secondary transfer roller 17 from each other immediately before the recording sheet enters therebetween. Hereinafter, the term "contactless-state secondary-transfer area" refers to the area where the intermediate transfer belt 15 and the secondary transfer roller 17 are disposed close to each other and contactless with each other.

When the recording sheet is fed to the secondary transfer nip with the intermediate transfer belt 15 in contact with the secondary transfer roller 17, the possibility of occurrence of a phenomenon called shock jitter increases. The shock jitter is a phenomenon as described below. When the leading end of the recording sheet is sandwiched in the secondary transfer nip, the torque of the motor for driving the secondary transfer roller 17 and the torque of the motor for driving the intermediate transfer belt 15 abruptly increase. Accordingly, the linear speeds of the secondary transfer roller 17 and the intermediate transfer belt 15 sharply decrease for a moment, thereby disturbing the image.

To suppress the occurrence of shock jitter, in the printer 1000 according to the present embodiment, the stepping motor 63 is driven to rotate slightly the eccentric cams 61 immediately before the recording sheet enters the secondary transfer nip, thereby separating the secondary transfer roller 17 from the intermediate transfer belt 15. Then, the recording sheet is conveyed into the contactless-state secondary-transfer area. At that time, the increase in the torque of the motor at the time of entry of the recording sheet into the contactless-state secondary-transfer area can be suppressed more significantly than that into the secondary transfer nip in which the secondary transfer roller 17 is in contact with the intermediate transfer belt 15. Accordingly, the occurrence of shock jitter is inhibited.

Immediately after feeding the leading end of the recording sheet into the contactless-state secondary-transfer area, the controller 200 drives in reverse the stepping motor 63 to rotate in reverse the eccentric cams 61, thereby pressing the secondary transfer roller 17 against the recording sheet and the intermediate transfer belt 15. This allows application of a necessary secondary transfer nip pressure.

After that, at the time of pulling the recording sheet out the secondary transfer nip similar to at the time of feeding the recording sheet into the secondary transfer nip, the controller 200 rotates the eccentric cams 61 in the normal direction by the stepping motor 63 to separate the secondary transfer roller 17 from the intermediate transfer belt 15 before pulling the trailing end of the recording sheet out the secondary transfer nip. Such action can suppress image deterioration resulting from the impact of pulling out the recording sheet from the secondary transfer nip.

A registration sensor 203 illustrated in FIG. 4 is a reflective optical sensor that detects the recording sheet immediately before arrival at the registration nip of the registration roller pair 14. The controller 200 stops temporarily the feeding of the recording sheet after the lapse of a predetermined time since receipt of the detection signal. Accordingly, the recording sheet with the leading end stack in the registration nip is slightly bent to correct the skewing of the recording sheet. The controller 200 also detects the position of the recording sheet in the conveyance path. The controller 200 starts driving of the stepping motor 63 after the lapse of a predetermined time since the start of driving of the registration roller pair 14 to separate the secondary transfer roller 17 from the intermediate transfer belt 15 immediately before the entry of the recording sheet into the secondary transfer nip.

A control panel 204 includes a touch panel, a numeric keypad, and the like. The control panel 204 displays a menu screen and messages and accepts key operations and touch operations from an operator.

In the above-described basic configuration, the ball bearings 62 serve as displacement bodies that move corresponding to changes in the rotation position of the eccentric cams 61 in contact with the ball bearings 62. The stepping motor 63 serves as a rotation driving source for the eccentric cams 61. The eccentric cams 61, the ball bearings 62 as displacement bodies, the stepping motor 63, and the cam power source 202 constitute a cam drive device to drive the eccentric cams 61. For each of yellow, magenta, cyan, and black, a combination of the unit 100 (100Y, 100M, 100C, or 100K) and the exposure device 9 serves as an image forming device to form toner images.

Next, descriptions are given below of a distinctive feature of the printer 1000 according to the present embodiment.

After the leading end of the recording sheet enters the contactless-state secondary-transfer area, it is necessary to move the secondary transfer roller 17 toward the intermediate transfer belt 15 as quickly as possible to press the recording sheet and the intermediate transfer belt 15 by the secondary transfer roller 17. Otherwise, a secondary transfer failure will occur at the leading end of the recording sheet for lack of secondary transfer nip pressure. However, bringing vigorously the secondary transfer roller 17 close to the intermediate transfer belt 15 would cause shock jitter due to an abrupt torque increase. Accordingly, there is a limitation on the speed of moving the secondary transfer roller 17. In the printer 1000 according to the present embodiment, the distance between the intermediate transfer belt 15 and the secondary transfer roller 17 (hereinafter also "roller-belt distance") in the contactless-state secondary-transfer area immediately before feeding of the recording sheet is set in accordance with the thickness of the recording sheet (hereinafter "recording sheet thickness").

Figure 5:
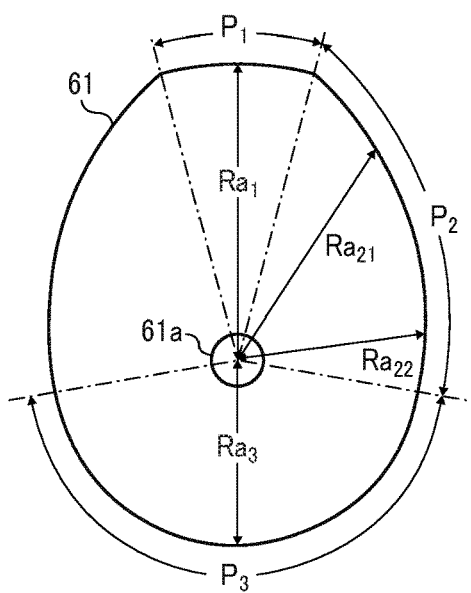
FIG. 5 is a front view of an eccentric cam in the contact-separation mechanism illustrated in FIG. 3A.

FIG. 5 is a front view of the eccentric cam 61. In the direction of circumference (direction of arc), each of the eccentric cams 61 includes a large-radius concentric curved portion $P_1$, a non-concentric curved portion $P_2$, and a small-radius concentric curved portion $P_3$. Each of the large-radius concentric curved portion $P_1$ and the small-radius concentric curved portion $P_3$ is a curved portion having a common center. That is, the radius (the distance from the center of the cam shaft 61a to the circumference) is constant entirely in the circumferential direction. The large-radius concentric curved portion $P_1$ (a first concentric portion) has a radius $Ra_1$ (radius of curvature), and the small-radius concentric curved portion $P_3$ (a second concentric portion) has a radius $Ra_1$ smaller than the radius $Ra_1$. By contrast, in the non-concentric curved portion $P_2$, the radius of curvature changes in the circumferential direction. For example, the non-concentric curved portion $P_2$ includes a small radius portion having a radius $Ra_{22}$ and a large radius portion having a radius $Ra_{21}$ greater than the radius $Ra_{22}$.

When each eccentric cam 61 stops at a rotation position where the circumferential center (a center in the circumferential direction) of the small-radius concentric curved portion $P_3$ faces the ball bearing 62 illustrated in FIG. 3A, the roller portion of the secondary transfer roller 17 is pressed against the intermediate transfer belt 15. The radius of curvature of the small-radius concentric curved portions $P_3$ is smaller than the roller radius of the secondary-transfer backup roller 16 around which the intermediate transfer belt 15 is looped. Accordingly, at such a rotation position, the small-radius concentric curved portions $P_3$ are separated from the ball bearings 62. Hereinafter, the rotation stop position of the eccentric cams 61 in this state will be referred to as "secondary transfer-pressurization position". At that time, the distance between the intermediate transfer belt 15 and the secondary transfer roller 17 is −1.29 mm. That is, the roller surface of the secondary transfer roller 17 is pressed by 1.29 mm toward the roller center at the secondary transfer nip.

The controller 200 stops the eccentric cams 61 at the secondary transfer-pressurization position to transfer secondarily the toner image from the intermediate transfer belt 15 to the main portion of the recording sheet, excluding the leading end and the trailing end, sandwiched in the secondary transfer nip. This ensures the secondary transfer while exerting sufficient secondary transfer pressure to the main portion of the recording sheet.

When the eccentric cams 61 stop at the rotation stop position where the circumferential centers of the large-radius concentric curved portions $P_1$ illustrated in FIG. 5 face the ball bearings 62 illustrated in FIG. 3A, the ball bearings 62 are pressed in the direction away from the intermediate transfer belt 15 while the large-radius concentric curved portions $P_1$ are in contact with the ball bearings 62. Then, the secondary transfer roller 17 is significantly separated from the intermediate transfer belt 15. The large-radius concentric curved portions $P_1$ serving as curved portions for stop are largest in radius in the eccentric cams 61. Accordingly, the distance between the secondary transfer roller 17 and the intermediate transfer belt 15 is maximum, which in the printer 1000 according to the present embodiment is 0.5 mm. Hereinafter, the rotation stop position of the eccentric cams 61 at that time will be referred to as "maximum separation position".

When no print job is performed, the controller 200 stops the rotation of the eccentric cams 61 at the maximum separation position to keep the distance between the secondary transfer roller 17 and the intermediate transfer belt 15 maximum. This makes it possible to avoid permanent deformation of the secondary transfer roller 17 and the intermediate transfer belt 15. The permanent deformation thereof is caused when no print job is processed for a long period of time while keeping the eccentric cams 61 at the secondary transfer-pressurization position to press the secondary transfer roller 17 against the intermediate transfer belt 15.

The controller 200 also performs control as described below to set the distance between the intermediate transfer belt 15 and the secondary transfer roller 17 at a pre-entry timing corresponding to recording sheet thickness. The term "pre-entry timing" means a timing immediately before the recording sheet is fed into the contactless-state secondary-transfer area. The controller 200 brings the non-concentric curved portions $P_2$ of the eccentric cams 61 into contact with the ball bearings 62. Specifically, the controller 200 stops the rotation of the eccentric cams 61 at the position where, of the entire circumference of the non-concentric curved portions $P_2$ of the eccentric cams 61, ranges having a radius corresponding to the thickness of the recording sheet are in contact with the ball bearings 62. With this operation, the distance between the intermediate transfer belt 15 and the secondary transfer roller 17 is set to the value corresponding to recording sheet thickness to suppress the occurrence of shock jitter. Hereinafter, such an action performed for suppressing the occurrence of shock jitter will be referred to as entry-time shock cancel action. That is, the entry-time shock cancel action is separating the secondary transfer roller 17 from the intermediate transfer belt 15 at the contactless-state secondary-transfer area at the distance corresponding to recording sheet thickness, performed at the pre-entry timing. The rotation stop position of the eccentric cams 61 where the non-concentric curved portions $P_2$ are in contact with the ball bearings 62 and the position of the eccentric cams 61 during rotation will be referred to as position for cancelling shock.

Immediately after the leading end of the recording sheet enters the contactless-state secondary-transfer area, the controller 200 slightly drives the stepping motor 63 to stop the eccentric cams 61 at the secondary transfer-pressurization position. With this action, the secondary transfer nip is formed, and the secondary transfer nip pressure is increased to a predetermined value for timing at which the main portion of the recording sheet enters the secondary transfer nip (hereinafter "main portion entry timing"). Hereinafter, this action will be referred to as post-entry nip forming action.

After performing the post-entry nip forming action, the controller 200 slightly drives the stepping motor 63 at a timing immediately before ejecting the trailing end of the recording sheet from the secondary transfer nip to stop the eccentric cams 61 at the same position as that in the entry-time shock cancel action. This makes it possible to set the distance between the intermediate transfer belt 15 and the secondary transfer roller 17 again to the value corresponding to recording sheet thickness. Hereinafter, this action will be referred to as ejection-time shock cancel action. Performing the ejection-time shock cancel action is advantageous in suppressing a temporary increase in linear speed of the intermediate transfer belt 15 and the like due to an abrupt reduction of torque when the trailing end of the recording sheet is ejected from the secondary transfer nip, thereby suppressing the occurrence of shock jitter that would result from the increase in linear speed. Such shock jitter can occur on the toner image to be secondarily transferred to a recording sheet subsequent to a continuous print job to form images consecutively on a plurality of recording sheets.

In the continuous print job, immediately after the trailing end of the recording sheet is ejected from the secondary transfer nip, the controller 200 slightly drives the stepping motor 63 to stop the eccentric cams 61 at the maximum separation position. In this state, the controller 200 waits for the timing for starting the next entry-time shock cancel action. Hereinafter, this action will be referred to as inter-sheet waiting action.

Figure 6:
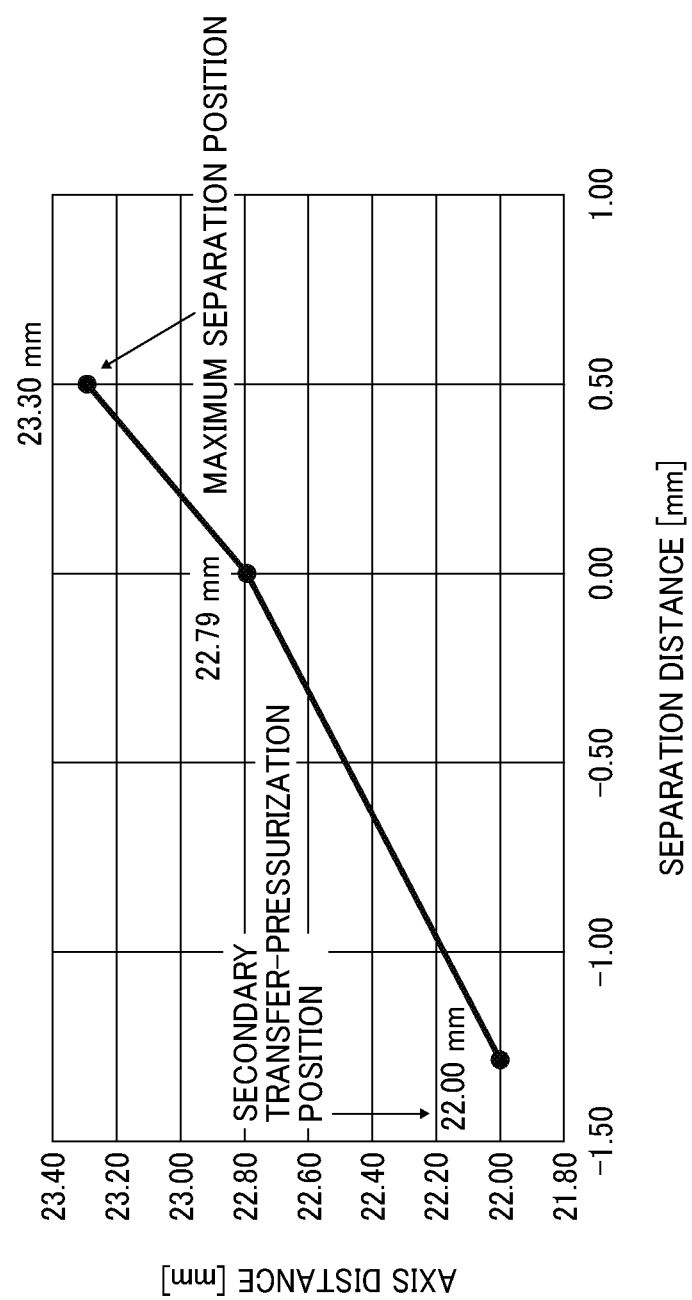
FIG. 6 is a graph illustrating the relationship between the distance from the intermediate transfer belt to the secondary transfer roller in the printer illustrated in FIG. 1 and the axis distance from an axis of a secondary transfer opposing roller to a axis of the secondary transfer roller.

FIG. 6 illustrates the relationship between the distance from the intermediate transfer belt 15 to the secondary transfer roller 17 and the distance from the axis of the secondary-transfer backup roller 16 to the axis of the secondary transfer roller 17. As illustrated in FIG. 6, the distance from the intermediate transfer belt 15 to the secondary transfer roller 17 increases as the distance between the axes thereof increases.

The combination of the controller 200 and the control panel 204 illustrated in FIG. 4 serves as an information acquisition unit that acquires information on the thickness of the recording sheet used. The control panel 204 has a menu key, an up key, a down key, a confirm key, a display, and the like. When a user presses the menu key, the controller 200 causes the display to display a menu screen. The user operates the up key or the down key to align a cursor on a desired menu among a plurality of menus displayed in the menu screen and press the confirm key to select the menu. When the user selects the "Input Sheet Type" menu through the operation of keys, the controller 200 allows the display to display a list of sheet brands. The user can select, through the operation of the up key and the down key, the same brand as the brand of the recording sheet set in the sheet container from a plurality of brands listed. The thickness of the recording sheet is correlated with the sheet brand on one-to-one basis. Thus, the brand is information indicating recording sheet thickness.

The controller 200 stores in a data storage circuit a data table in which the brands are correlated to the numbers of step pulses of the stepping motor 63 corresponding to the brands. The number of step pulses in the data table is indicated as a numeric value to enable the stepping motor 63 to drive by an amount necessary to separate the secondary transfer roller 17 from the intermediate transfer belt 15 at the distance corresponding to recording sheet thickness correlated to the brand. More specifically, after performing the inter-sheet waiting action, the controller 200 transmits to the motor driver 201 a control signal corresponding to the number of step pulses correlated to the brand in the data table. Accordingly, the motor driver 201 transmits the same number of step pulses as that number to the stepping motor 63 to rotate the eccentric cams 61 by a rotation angle corresponding to the recording sheet thickness. By such rotation, the entry-time shock cancel action is performed to separate the secondary transfer roller 17 from the intermediate transfer belt 15 at the distance corresponding to the recording sheet thickness. The controller 200 performs the same control in the ejection-time shock cancel action.

As the distance between the secondary transfer roller 17 and the intermediate transfer belt 15 is set to the distance corresponding to the sheet thickness in the entry-time shock cancel action, the following effect is available in the subsequent post-entry nip forming action. That is, immediately after the secondary transfer roller 17 starts moving toward the intermediate transfer belt 15, the secondary transfer roller 17 can press the recording sheet to form the secondary transfer nip. This can suppress the occurrence of shock jitter caused by bringing vigorously the secondary transfer roller 17 close to the intermediate transfer belt 15 immediately after the entry-time shock cancel action, thereby suppressing the occurrence of a secondary transfer failure due to insufficient secondary transfer nip pressure at the leading end of the recording sheet.

Also in the ejection-time shock cancel action, as the control similar to that in the entry-time shock cancel action is performed to set the roller-belt distance corresponding to the sheet thickness, the following effect is available in the subsequent inter-sheet waiting action. That is, the secondary transfer roller 17 can be quickly brought into contact with the intermediate transfer belt 15 unless significantly thick recording sheets are used.

However, the inventors recognize that, the above-described configuration may cause an increase in power consumption of the stepping motor 63.

In one manner of separating the secondary transfer roller 17 from the intermediate transfer belt 15, the large-radius concentric curved portions $P_1$ of the eccentric cams 61 are brought into contact with the ball bearings 62 to make the distance between the secondary transfer roller 17 and the intermediate transfer belt 15 maximum. The large-radius concentric curved portions $P_1$ are curved at a constant curvature, and the ball bearings 62 with which the large-radius concentric curved portions $P_1$ are brought into contact are also concentrically curved with a constant curvature. That is, in the above-described manner, the concentric portions are in contact with each other.

In another manner of separating the secondary transfer roller 17 from the intermediate transfer belt 15, the relatively large-radius areas of the non-concentric curved portions $P_2$ of the eccentric cams 61 are brought into contact with the ball bearings 62. The curvature of the non-concentric curved portions $P_2$ is not constant to vary the radius in the profile. When the non-concentric curved portion $P_2$ is brought into contact with the ball bearing 62, the following force tends to act on the contact portion between the eccentric cam 61 and the ball bearing 62. The force rotates the eccentric cam 61 in a direction to reduce the radius of the portion of the eccentric cam 61 in contact with the ball bearing 62 (the force of rotation in smaller-radius direction). By contrast, the radius of curvature of the large-radius concentric curved portion $P_1$ is constant and does not exert such force on the contact portion. Accordingly, in the manner of bringing the non-concentric curved portion $P_2$ into contact with the ball bearing 62 to separate the secondary transfer roller 17 from the intermediate transfer belt 15, the above-mentioned force may rotate the stepping motor 63 in stop state and the eccentric cams 61 unless a configuration described below is employed. That is, compared with the manner of separating the large-radius concentric curved portion $P_1$ into contact with the ball bearing 62, a larger excitation current is supplied to the stepping motor 63 in stop state to enable the stepping motor 63 to resist against the above-mentioned force (hereinafter "rotation inhibiting force"). Nevertheless, employing this configuration would increase the power consumption of the stepping motor 63.

In view of the foregoing, in the printer 1000 according to the present embodiment, the controller 200 is configured as described below. That is, the controller 200 is configured to change the excitation current output from the cam power source 202 to generate a desired torque to the stepping motor 63 in stop state in accordance with changes in the rotation stop position of the eccentric cams 61. Specifically, the controller 200 performs the control as described below. The controller 200 changes the output value of the excitation current between the maximum separation position where the large-radius concentric curved portions $P_1$ of the eccentric cams 61 are in contact with the ball bearings 62 and the rotation stop position where the non-concentric curved portions $P_2$ of the eccentric cams 61 are in contact with the ball bearings 62. More specifically, the controller 200 sets the output value of the excitation current at the maximum separation position to be smaller than the output value of the excitation current at the rotation stop position where the non-concentric curved portions $P_2$ of the eccentric cams 61 are in contact with the ball bearings 62. Even when the output value is lowered as described above, the force of rotation in smaller-radius direction is not generated in a state where the eccentric cams 61 are at the maximum separation position. This can prevent the eccentric cams 61 in stop state from being rotated by the force of rotation in smaller-radius direction. This control can suppress increases in the power consumption of the stepping motor 63 compared with the configuration in which the latter output current value is set to be as high as the former output current value to exert the rotation inhibiting force.

The controller 200 also sets the output value of the excitation current in a state where the eccentric cams 61 kept are at the secondary transfer-pressurization position to be smaller than the output value of the excitation current at the rotation stop position where the non-concentric curved portions $P_2$ of the eccentric cams 61 are in contact with the ball bearings 62. Even when the output value is lowered as described above, the force of rotation in smaller-radius direction is not generated when the eccentric cams 61 are not in contact with the ball bearings 62 at the secondary transfer-pressurization position. This can prevent the eccentric cams 61 in stop state from being rotated by the force of rotation in smaller-radius direction. In this configuration as well, increases in the power consumption of the stepping motor 63 are suppressed, compared with the configuration in which the latter output current value is set to be as high as the former output current value to exert the rotation inhibiting force.

Table 1 indicates the relationship among various actions in the printer 1000, the distance from the intermediate transfer belt 15 to the secondary transfer roller 17, the rotational state of the eccentric cams 61, the sections of the eccentric cams 61 in contact with the ball bearings 62, motor actions, and excitation current. The excitation current refers to excitation current supplied to the stepping motor 63. In Table 1, for the sake of convenience, the entry-time shock cancel action and the ejection-time shock cancel action are mentioned as entry-time cancel and ejection-time cancel, respectively.

TABLE 1

| Action | Roller-Belt Distance (mm) | State of Cam | Contact Portion of Cam | Action of Stepping Motor | Excitation Current (A) |
|---|---|---|---|---|---|
| Inter-Sheet Waiting | 0.51 | Stop | $P_1$ | Stop | 0.7 |
| Entry-Time Cancel (During Action) | Action in range from 0.25 and below 0.51 | Rotating | Fromf $P_1$ to $P_2$ | Driving | 1.3 |
| Entry-Time Cancel (Immediately After Action) | Stop at a value corresponding to sheet thickness in the above range | Stop | $P_2$ | Stop | 1.3 |

TABLE 1-continued

| Action | Roller-Belt Distance (mm) | State of Cam | Contact Portion of Cam | Action of Stepping Motor | Excitation Current (A) |
|---|---|---|---|---|---|
| Post-Entry Nip Formation (During Action) | Action in Range above −1.29 and below the above value | Rotating | From $P_2$ to contactless with $P_3$ | Driving | 1.3 |
| Post-Entry Nip Formation (Immediately After Action) | −1.29 | Stop | Contactless with $P_3$ | Stop | 0.7 |
| Ejection-Time Cancel (During Action) | Action in Range above −1.29 and below the above value | Rotating | Contactless to $P_2$ | Driving | 1.3 |
| Ejection-Time Cancel (Immediately After Action) | Stop at value corresponding to sheet thickness in range of from 0.25 below 0.51 | Stop | $P_2$ | Stop | 1.3 |
| Immediately After Job-Start | 0.51 | Stop | $P_1$ | Stop | 0.7 |
| Job-End Preparation | In range from value corresponding to sheet thickness and below 0.51 | Rotating | From $P_2$ to $P_1$ | Driving | 1.3 |
| No Ongoing-Job | 0.51 | Stop | $P_1$ | Stop | 0.7 |

In Table 1, "immediately after job-start" refers to a timing after receipt of a print job command signal from the user and earlier than the pre-entry timing. The timing immediately before a print job is started is "no ongoing-job" timing, at which the eccentric cams 61 are stopped at the maximum separation position with the large-radius concentric curved portions $P_1$ kept in contact with the ball bearings 62 as indicated in Table 1. The controller 200 stops the rotation of the eccentric cams 61 at the maximum separation position at the immediately after job-start timing as well as no ongoing-job timing immediately before immediately after job-start timing.

In Table 1, "job-end preparation" refers to an action performed until just before the end of the print job after the ejection-time shock cancel action is performed on the last recording sheet. In the job-end preparation, the eccentric cams 61, which has been at the position for cancelling shock with the non-concentric curved portions $P_2$ in contact with the ball bearings 62 in the ejection-time cancel action, are rotated in the direction toward the maximum separation position.

Of the timings listed in Table 1, the eccentric cams 61 are stopped in six timings of: inter-sheet waiting, entry-time cancel (immediately after action), post-entry nip formation (immediately after action), immediately after job-start, and no ongoing-job. Specifically, of the six timings, the eccentric cams 61 are kept in the below-mentioned stop state in four timings of: inter-sheet waiting, post-entry nip formation (immediately after action), immediately after job-start, and the no ongoing-job. That is, the eccentric cams 61 are stopped at the maximum separation position with the large-radius concentric curved portions $P_1$ kept in contact with the ball bearings 62, or the eccentric cams 61 are stopped at the secondary transfer-pressurization position. In these states, as already described above, the force of rotation in the smaller-radius direction is not generated, and it is thus possible to prevent the rotation of the stepping motor 63 in stop state without supply of a large excitation current to the stepping motor 63 to exert the rotation inhibiting force.

Meanwhile, the force of rotation in the smaller-radius direction is generated when the eccentric cams 61 are stopped at the position for cancelling shock where the non-concentric curved portions $P_2$ of the eccentric cams 61 are in contact with the ball bearings 62. In addition, while the eccentric cams 61 are rotated, the torque of the stepping motor 63 increases due to the friction between the eccentric cams 61 and the ball bearings 62. Despite the above-mentioned circumstances, assume that the output value of the excitation current while the eccentric cams 61 are at the stop position for cancelling shock or are rotating is set as small as the output value in the states where the eccentric cams 61 are at the maximum separation position or the secondary transfer-pressurization position. In this case, the eccentric cams 61 in stop state may be rotated by the force of rotation in the smaller-radius direction or the eccentric cams 61 inhibited from rotating due to a temporary halt of the motor resulting from a loss of synchronization.

Accordingly, when the eccentric cams 61 are stopped at the position for cancelling shock or the eccentric cams 61 are rotating, the controller 200 sets the output value of the excitation current to 1.3 A as indicated in Table 1, at which a loss of synchronization of the motor can be prevented and the eccentric cams 61 in stop state can be prevented from rotating. In contrast to this, when the eccentric cams 61 are stopped at the maximum separation position or the secondary transfer-pressurization position, the controller 200 sets the output value of the excitation current to 0.7 A, smaller than 1.3 A.

Figure 7:
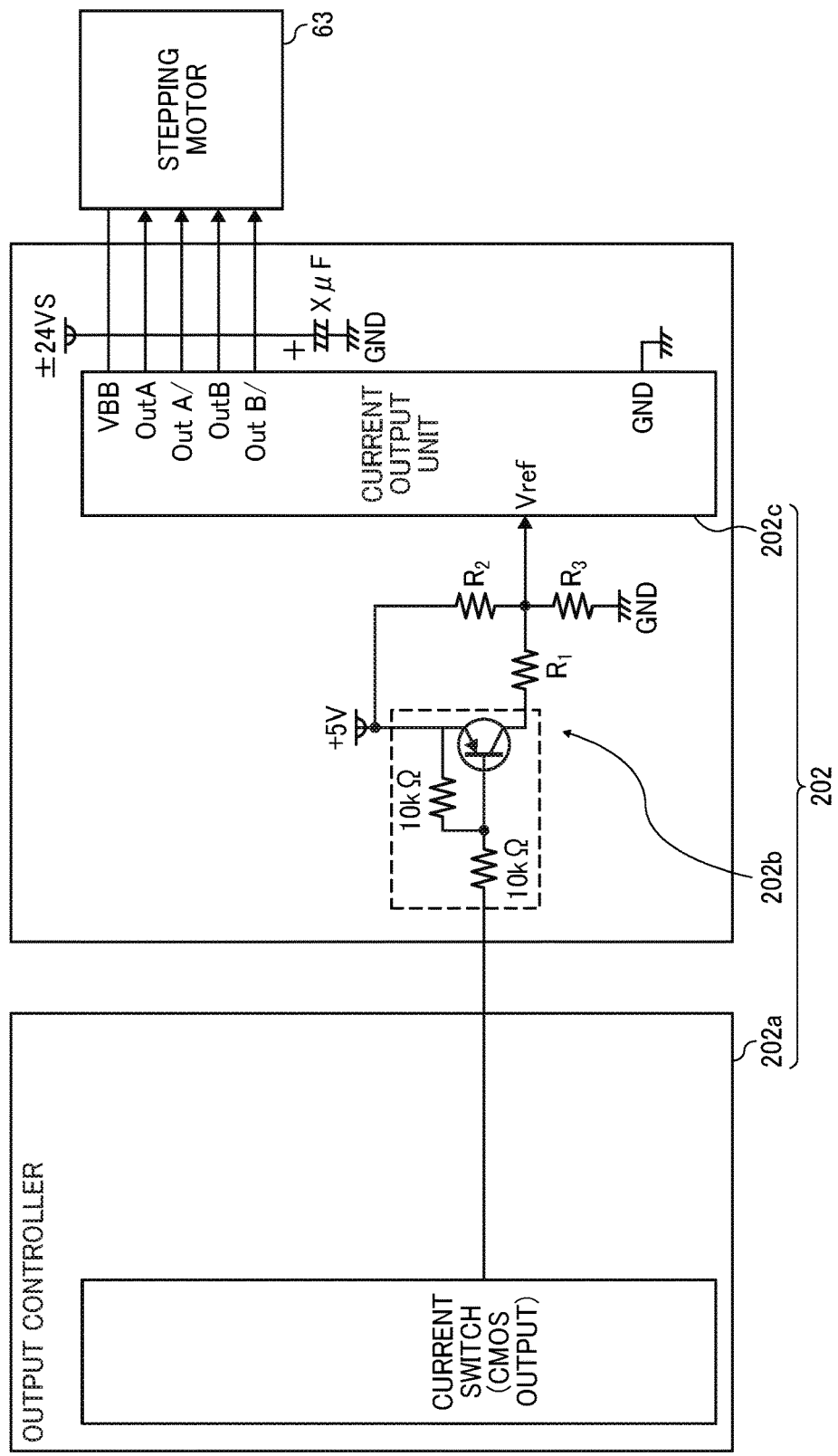
FIG. 7 is a block diagram illustrating electric circuitry of a cam power source in the printer illustrated in FIG. 1 with a stepping motor.

FIG. 7 is a block diagram of electric circuitry of the cam power source 202 together with the stepping motor 63. As illustrated in FIG. 7, the cam power source 202 includes an output controller 202a, an output adjustment unit 202b, and a current output unit 202c. The output controller 202a performs a control to stop the output of excitation current from the current output unit 202c and set the output value of the excitation current to 0.7 A or 1.3 A, according to a control signal from the controller 200. When the output controller 202a sets the output value of the excitation current to 0.7 A, a relatively small current flows from the output adjustment unit 202b to the current output unit 202c, through a second resistor $R_2$ and a third resistor $R_3$ of the output adjustment unit 202b in series. Accordingly, an excitation current of 0.7 A is supplied from the current output unit 202c to the stepping motor 63. When the output controller 202a sets the output value of the excitation current to 1.3 A, a relatively large current flows from the output adjustment unit 202b to the current output unit 202c, through only a first resistor $R_1$ of the output adjustment unit 202b. Accordingly, an excitation current of 1.3 A is supplied from the current output unit 202c to the stepping motor 63.

Figure 8:
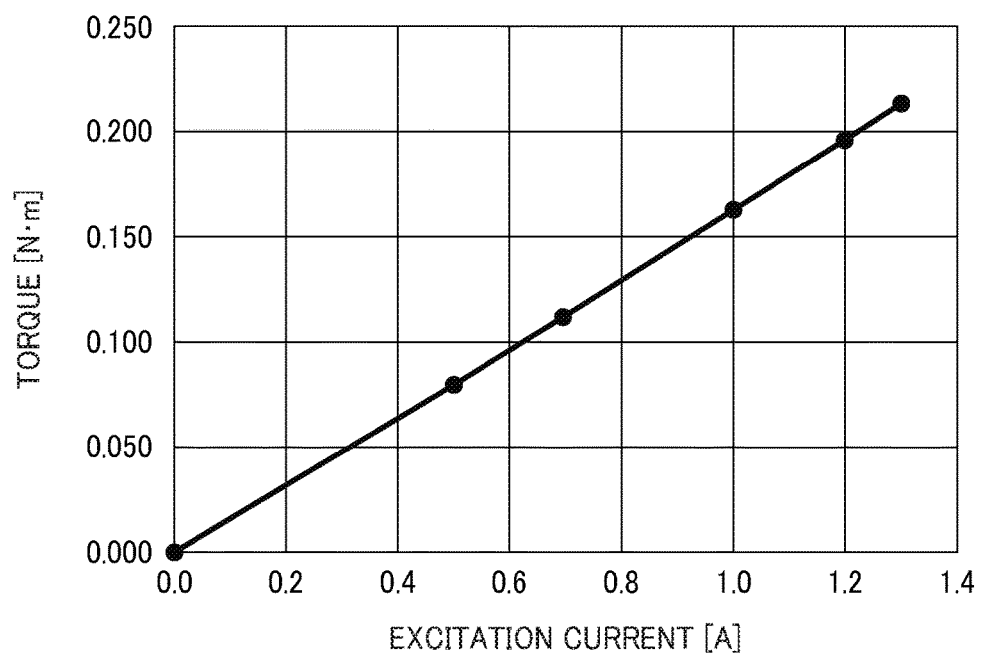
FIG. 8 is a graph illustrating the relationship between the torque of the stepping motor and excitation current supplied to the stepping motor.

The stepping motor 63 is driven at a rotation speed of 1000 pps. FIG. 8 is a graph illustrating the relationship between the torque of the stepping motor 63 in the printer 1000 and the excitation current supplied to the stepping motor 63 at the time of rotation at 1000 pulses per second (pps). Through a preliminary experiment, the inventors recognize that, when the eccentric cams 61 are stopped at the maximum separation position or the secondary transfer-pressurization position, producing a torque of 0.112 N·m to the stepping motor 63 can prevent the rotation of the eccentric cams 61 in stop state. It can be understood from FIG. 8 that a torque of 0.112 N·m can be achieved by supplying an excitation current of 0.7 A to the stepping motor 63. This is because the controller 200 is configured to set the output value of the excitation current to 0.7 A when the eccentric cams 61 are stopped at the maximum separation position or the secondary transfer-pressurization position.

In addition, the preliminary experiment has revealed that it is possible to prevent a loss of synchronization of the motor during the rotation of the eccentric cams 61 and prevent the rotation of the eccentric cams 61 stopped at the position for cancelling shock by making the measure described below. That is, producing a torque of 0.213 N·m to the stepping motor 63 can prevent the above-mentioned problems. This is because the controller 200 is configured to set the output value of the excitation current to 1.3 A when the eccentric cams 61 are being rotated or the eccentric cams 61 are stopped at the position for cancelling shock.

Next, a description will be given of examples in which a more specific configuration is applied to the printer 1000 according to the present embodiment. Furthermore, the configuration of the printer according to Examples is the same as in the present embodiment unless otherwise stated.

In the printer 1000 according to the present embodiment, when the eccentric cams 61 are stopped at the cancel action position, the output value of the excitation current is uniformly set to 1.3 A regardless of differences in the section of the non-concentric curved portions $P_2$ of the eccentric cams 61 in contact with the ball bearings 62. However, when the eccentric cams 61 are stopped at the position for cancelling shock, the minimum output current value necessary for exerting the rotation inhibiting force against the force of rotation in the smaller-radius direction varies depending on the contact portion. Specifically, the minimum output current value becomes smaller with the decreasing radius of the contact portion.

Accordingly, the controller 200 is configured to reduce the output value of the excitation current with decreases in the radius of the contact point. The output current value is set to a minimum value within a range of 0.7 to 1.3 A depending on the radius. To achieve the above-mentioned setting, the output adjustment unit 202b of the cam power source 202 includes a variable resistor to adjust the value of current supplied to the current output unit 202c in multiple stages according to the control signal from the output controller 202a, instead of the first resistor $R_1$, the second resistor $R_2$, and the third resistor $R_3$. This can adjust the value of current output from the current output unit 202c in multiple stages.

In this configuration, it is possible to further suppress increase in the power consumption of the stepping motor 63 compared with the printer 1000 according to the present embodiment.

Instead of reducing the output value of the excitation current decreases in the radius of the contact point, the output value of the excitation current can be reduced as the rate of change of deformation decreases. In addition, the non-concentric curved portions $P_2$ can be shaped in such that the rate of change of radius of the non-concentric curved portions $P_2$ per rotation angle becomes greater as the position becomes closer to the small-radius concentric curved portions $P_3$.

In the above-mentioned configuration, the secondary transfer roller 17 is separated from the intermediate transfer belt 15 in the entry-time shock cancel action or the ejection-time shock cancel action. Alternatively, the secondary transfer roller 17 can be kept in contact with the intermediate transfer belt 15 as described below. That is, while the secondary transfer roller 17 is kept in contact with the intermediate transfer belt 15, the axial distance is shortened to lower the secondary transfer nip pressure compared with that at the time of post-entry nip formation.

In the example described above, the eccentric cams 61 are stopped at the position for cancelling shock to set the distance between the intermediate transfer belt 15 and the secondary transfer roller 17 (roller-belt distance) to a value corresponding to recording sheet thickness. The position for cancelling shock can be employed for the aim described below. That is, instead of setting the roller-belt distance corresponding to the sheet thickness, the positions of the non-concentric curved portions $P_2$ in contact with the ball bearings can be finely adjusted to set the roller-belt distance to a designed value with high accuracy regardless of individual shape error in the eccentric cams 61.

In addition, instead of using a combination of the controller 200 and the control panel 204 as the information acquisition unit, a thickness detector can be provided to detect the thickness of the recording sheet. For example, the thickness detector is configured to detect the sheet thickness based on the amount of displacement of the roller when the conveyed recording sheet is sandwiched in the nip between the rollers in contact with each other.

The structures described above are just examples, and various aspects of the present disclosure can attain, for example, the following effects, respectively. Aspect A Aspect A is a cam drive device including a rotatable cam (for example, the eccentric cam 61); a displacement body (for example, the ball bearing 62) to be displaced in response to changes in the rotation position of the cam in contact with the displacement body; a motor (for example, the stepping motor 63) as a driving source to rotate the cam; and a power source (for example, the cam power source 202) to output electric current to be supplied to the motor. The cam drive device further includes a controller (for example, the controller 200) to control the value of current output from the power source (for example, the excitation current when the motor is not rotating) for causing a stall torque to the stopped motor so as to change the current output from the power source according to differences in the rotation stop position of the cam.

In Aspect A, to inhibit the stopped cam from rotating, it is necessary to set the value of current output from the power source to a certain degree of value to cause a stall torque of necessary magnitude in the motor. The minimum output current value necessary for that varies depending on the rotation stop position of the cam. Specifically, the minimum output current value when the cam is stopped at the position where the concentric curved portion of the cam is in contact with the displacement body is smaller than the minimum output current value when the cam is stopped at the position where the non-concentric curved portion of the cam is in contact with the displacement body. Accordingly, in Aspect A, the value of current output from the power source is made different between the first rotation stop position where the concentric curved portion of the cam is in contact with the displacement body and the second rotation stop position where the non-concentric curved portion of the cam is in contact with the displacement body. This configuration can achieves the effect described below, by setting the output current value at the first rotation stop position where the concentric curved portion of the cam is in contact with the displacement body to be smaller than the output current value at the second rotation stop position where the non-concentric curved portion of the cam is in contact with the displacement body while maintaining the minimum output current value. That is, it is possible to reduce the power consumption compared with that in the case of setting the output current value at the first rotation stop position where the concentric curved portion of the cam is in contact with the displacement body to be equal to the output current value at the second the rotation stop position where the non-concentric curved portion of the cam is in contact with the displacement body, while maintaining the minimum output current value. This can suppress increase in the power consumption caused when the cam is stopped at the position where the non-concentric curved portion of the cam is in contact with the displacement body.

Aspect B

In Aspect B according to Aspect A, the controller is configured to change the output current value between a first rotation stop position and a second rotation stop position of the cam. At the first rotation stop position, the concentric curved portion (for example, the large-radius concentric curved portion $P_1$) having a constant curvature centered on the axis of the cam is in contact with the displacement body. At the second rotation stop position, the non-concentric curved portion (for example, the non-concentric curved portion $P_2$) in which a curvature centered on the axis of the cam is not constant is in contact with the displacement body. This configuration can suppress increase in the power consumption caused when the eccentric cam is stopped at the position where the non-concentric curved portion of the cam is in contact with the displacement body.

Aspect C

In Aspect C according to Aspect B, the controller is configured to set the output current value at the first rotation stop position where the concentric curved portion is in contact with the displacement body to be smaller than the output current value at the second rotation stop position where the non-concentric curved portion is in contact with the displacement body. This configuration can suppress increase in the power consumption caused when the eccentric cam is stopped at the position where the non-concentric curved portion of the cam is in contact with the displacement body.

Aspect D

In Aspect D according to Aspect C, the non-concentric curved portion includes a small radius portion and a large radius portion larger in radius of curvature than a small radius portion. The second rotation stop position includes a small-radius position where a small radius portion of the non-concentric curved portion is in contact with the displacement body and a large-radius position where the large radius portion is in contact with the displacement body. In such a structure, the controller is configured to set the output current value at the small-radius position to be smaller than the output current value at the large-radius position. This configuration can suppress increase in the power consumption compared with the case of keeping the output current value constant regardless of the portion of the non-concentric curved portion in contact with the displacement body, while ensuring the minimum output current value.

Aspect E

In Aspect E according to Aspect C or D, the controller is configured to set the output current value to rotate the cam by driving of the motor to be smaller than the output current value at the first rotation stop position where the concentric curved portion is in contact with the displacement body. This configuration can suppress increase in the power consumption compared with the configuration in which to equalize the output voltage value when the cam is being rotated and the output voltage value when the cam is stopped at the position where the concentric curved portion of the cam is in contact with the displacement body, while ensuring the minimum output voltage value.

Aspect F

Aspect F is an image forming apparatus including an image forming device unit to form an image on a recording sheet, and the image forming device includes the cam drive device according to any one of Aspects A through E.

Aspect G

Aspect G is an image forming apparatus that includes an image forming device (for example, a combination of the unit 100 and the exposure device 9) to form an image on a recording sheet, provided with the cam drive device according to any one of Aspects B to E. The image forming apparatus further includes an image bearer (for example, the intermediate transfer belt 15) that bears the toner image formed by the image forming device on a surface thereof; a nip forming body (for example, the secondary transfer roller 17) that forms a transfer nip by contact with the image bearer; and a transfer device (for example, a combination of the transfer unit 2 and the secondary transfer device 4) that transfers the toner image on the surface of the image bearer to a recording sheet sandwiched in the transfer nip. At least one of a nip pressure in the transfer nip and a distance between the image bearer and the nip forming body is changed by driving of the cam to rotate by the cam drive device. This configuration can change the nip pressure or the distance by driving of the cam by the cam drive device.

Aspect H

In Aspect H according to Aspect G, the controller is configured to set the nip pressure at the timing when a main portion of the recording sheet excluding a leading end and a trailing end in the direction of conveyance of the recording sheet is not in the transfer nip to be smaller than the nip pressure at the timing when the sheet main portion is in the transfer nip. This configuration can apply a sufficient nip pressure to the main portion of the sheet sandwiched in the transfer nip and suppress the degradation of the nip forming body and the image bearer caused by applying an unnecessary nip pressure when the main portion of the sheet is not sandwiched in the transfer nip.

Aspect I

In Aspect I according to Aspect H, the controller is configured to, at the sheet main portion entry timing, bring the cam into a rotation stop position where the cam is not in contact with the displacement body so that a drag of the cam is not applied to a biasing member that biases the nip forming body toward the image bearer but the nip forming body is pressurized toward the image bearer to form the transfer nip. This configuration can use efficiently the biasing force of the biasing member at the sheet main portion entry timing to apply a sufficient nip pressure to the sheet main portion sandwiched in the transfer nip.

Aspect J

In Aspect J according to Aspect I, the controller is configured to, at a pre-entry timing when the leading end of the recording sheet enters between the image bearer and the nip forming body, bring the cam into the second rotation stop position where the non-concentric curved portion of the cam is in contact with the displacement body to separate the nip forming body from the image bearer and set the output current value to be larger than that at the sheet main portion entry timing. This configuration can suppress the occurrence of shock jitter when the leading end of the recording sheet enters the transfer nip.

Aspect K

In Aspect K according to Aspect J, the concentric curved portion of the cam includes a curved portion for stop. The controller is configured to, when an image forming action is stopped (for example, a print job is stopped), bring the cam into the rotation stop position where the curved portion for stop is in contact with the displacement body to separate the nip forming body from the image bearer and set the output current value to be smaller than that at the pre-entry timing. This configuration can avoid the occurrence of permanent deformation of the nip forming body and the image bearer caused by stopping the image forming action with the nip forming body kept in contact with the image bearer for a long period of time.

Aspect L

In Aspect L according to Aspect J or K, the controller is configured to, at a pre-ejection timing immediately before the trailing end of the recording sheet is ejected from between the image bearer and the nip forming body, stop the cam at the second the rotation stop position where the non-concentric curved portion of the cam is in contact with the displacement body to reduce the nip pressure and increase the output current value compared with those at the sheet main portion entry timing. This configuration can suppress the occurrence of shock jitter when the trailing end of the recording sheet is ejected from the transfer nip.

Aspect M

In Aspect M according to any one of Aspects J to L, the concentric curved portion of the cam includes a curved portion for stop (for example, the large-radius curved portion $P_1$). The controller is configured to, when the image forming action is stopped, bring the cam into the rotation stop position (for example, the maximum separation position) where the curved portion for stop is in contact with the displacement body to separate the nip forming body from the image bearer and set the output current value to be smaller than that at the pre-entry timing. In this configuration, use of the concentric curved portion as the curved portion for stop can set the minimum output voltage value when the image forming action is stopped to be smaller than the minimum output voltage value at the sheet main portion entry timing.

Aspect N

In Aspect N according to Aspect M, the controller is configured to bring the cam into the second the rotation stop position (where the non-concentric curved portion of the cam is in contact with the displacement body) to separate the nip forming body from the image bearer and set the output current value to be larger than that at the sheet main portion entry timing at a timing satisfying:

a) during a continuous image forming action (for example, a continuous print job) in which images are consecutively formed on a plurality of recording sheets;

b): of the entire surface of the image bearer in the direction of movement of the image bearer, an inter-sheet area (between an area in contact with the preceding recording sheet and an area in contact with the subsequent sheet is in the transfer nip; and c) the timing is the pre-entry timing (immediately before the recording sheet is fed into the transfer area. This configuration can suppress the occurrence of shock jitter by bringing the non-concentric curved portion of the cam into contact with the displacement body to separate the nip forming body from the image bearer at the pre-entry timing or the pre-ejection timing during the continuous image forming action.

Aspect O

In Aspect O according to any one of Aspects J to N, the image forming apparatus further includes an information acquisition unit (for example, a combination of the controller 200 and the control panel 204) to acquire information on thickness of the recording sheet used. Further, the controller is configured to change a portion of the non-concentric curved portion in contact with the displacement body at the pre-entry timing according to result of acquisition by the information acquisition unit to change the distance between the nip forming body and the image bearer according to the thickness. This configuration can suppress the occurrence of a transfer failure due to insufficient nip pressure, by applying a nip pressure to the recording sheet immediately after the rotation of the cam is started at the pre-entry timing. It is further possible to suppress the occurrence of shock jitter caused by bringing vigorously the nip forming body into contact with the image bearer at the pre-entry timing.

Aspect P

In Aspect P according to Aspect O, the cam drive device according to Aspect D is used, and the controller is configured to further reduce the output current value with the decreasing rotation radius of the portion of the non-concentric curved portion in contact with the displacement body. This configuration can suppress increase in the power consumption compared with the case of keeping the output current value constant regardless of differences in the portion of abutment, while ensuring the minimum output current value.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A cam drive device comprising:
an eccentric cam configured to rotate, the eccentric cam including a first portion and a second portion, the second portion having a different curvature from the first portion;
a displacement body configured to displace in response to a change in a rotation position of the eccentric cam in contact with the displacement body;
a motor configured to rotate the eccentric cam; and
a power source configured to output an electric current to be supplied to the motor, wherein an electric current configured to cause a stall torque to the motor being a stop state is changed in response to a rotation stop position of the eccentric cam changing between a first rotation stop position associated with the first portion of the eccentric cam and a second rotation stop position associated with the second portion of the eccentric cam such that the electric current at the first rotation stop position is less than the electric current at the second rotation stop position.

2. The cam drive device according to claim 1, wherein the first portion is a concentric curved portion in which a curvature centered on an axis of the eccentric cam is constant,
the second portion is a non-concentric curved portion in which the curvature centered on the axis of the eccentric cam is not constant, and
wherein the electric current is changed between the first rotation stop position of the eccentric cam and the second rotation stop position of the eccentric cam, the first rotation stop position at which the concentric curved portion is in contact with the displacement body, the second rotation stop position at which the non-concentric curved portion is in contact with the displacement body.

3. The cam drive device according to claim 2, wherein the second rotation stop position includes:
a small-radius position at which a small radius portion of the non-concentric curved portion is in contact with the displacement body; and
a large-radius position at which a large radius portion of the non-concentric curved portion is in contact with the displacement body, the large radius portion larger in radius of curvature than the small radius portion,
wherein the electric current when the eccentric cam is at the small-radius position is set smaller than the electric current when the eccentric cam is at the large-radius position.

4. The cam drive device according to claim 2, wherein electric current configured to rotate the eccentric cam by driving of the motor is smaller than the electric current when the eccentric cam is at the first rotation stop position.

5. The cam drive device according to claim 1, further comprising:
a controller configured to control the electric current such that the electric current at the first rotation stop position is less than the electric current at the second rotation stop position.

6. An image forming apparatus comprising:
an image forming device configured to form a toner image on a recording sheet, the image forming device including a cam drive device, the can drive device including,
an eccentric cam configured to rotate, the eccentric cam including a first portion and a second portion, the second portion having a different curvature from the first portion;
a displacement body configured to displace in response to a change in a rotation position of the eccentric cam in contact with the displacement body;
a motor configured to rotate the eccentric cam; and
a power source configured to output an electric current to be supplied to the motor, wherein
an electric current configured to cause a stall torque to the motor being a stop state is changed in response to a rotation stop position of the eccentric cam changing between a first rotation stop position associated with the first portion of the eccentric cam and a second rotation stop position associated with the second portion of the eccentric cam such that the electric current at the first rotation stop position is less than the electric current at the second rotation stop position.

7. The image forming apparatus according to claim 6, further comprising:
an image bearer configured to bear the toner image formed by the image forming device;
a nip forming body configured to contact the image bearer to form a transfer nip; and
a transfer device configured to transfer the toner image from the image bearer onto a recording sheet sandwiched in the transfer nip, wherein:
the first portion is a concentric curved portion in which a curvature centered on an axis of the eccentric cam is constant; and
the second portion is a non-concentric curved portion in which the curvature centered on the axis of the eccentric cam is not constant,
wherein at the first rotation stop position the concentric curved portion is in contact with the displacement body, and at the second rotation stop position the non-concentric curved portion is in contact with the displacement body, and
wherein the cam drive device changes, with driving of the cam, at least one of a nip pressure in the transfer nip and a distance between the image bearer and the nip forming body.

8. The image forming apparatus according to claim 7, wherein the nip pressure is set smaller at a sheet main portion entry timing at which a main portion of the recording sheet is not in the transfer nip than when the main portion of the recording sheet is in the transfer nip.

9. The image forming apparatus according to claim 8, further comprising:
a biasing member configured to press the nip forming body toward the image bearer,
wherein, at the sheet main portion entry timing, the cam is set at a position contactless with the displacement body to form the transfer nip.

10. The image forming apparatus according to claim 9, wherein, at a pre-entry timing immediately before a leading end of the recording sheet enters between the image bearer and the nip forming body, the cam is set at the second rotation stop position to separate the nip forming body from the image bearer, and
wherein the electric current is larger at the pre-entry timing than at the sheet main portion entry timing.

11. The image forming apparatus according to claim 10, wherein the concentric curved portion of the cam includes:
a first concentric portion; and
a second concentric portion smaller in radius of curvature than the first concentric portion,
wherein, when an image forming action is not performed, the cam is set at a position at which the first concentric portion is in contact with the displacement body to separate the nip forming body from the image bearer, and
wherein the electric current is set smaller when the image forming action is not performed than at the pre-entry timing.

12. The image forming apparatus according to claim 10, wherein, at a pre-ejection timing immediately before a trailing end of the recording sheet in a direction of conveyance of the recording sheet is ejected from between the image bearer and the nip forming body, the cam is stopped at the second rotation stop position to reduce the nip pressure, and
    wherein the electric current is set greater at the pre-ejection timing than at the sheet main portion entry timing.

13. The image forming apparatus according to claim 12, wherein the concentric curved portion of the cam includes:
    a first concentric portion; and
    a second concentric portion smaller in radius of curvature than the first concentric portion,
    wherein, when an image forming action is not performed, the cam is set at a position at which the first concentric portion is in contact with the displacement body to separate the nip forming body from the image bearer, and
    wherein the electric current is set smaller when the image forming action is not performed than at the pre-entry timing.

14. The image forming apparatus according to claim 13, wherein, at a timing satisfying:
    a) during a continuous image forming action;
    b) an inter-sheet area of the image bearer in a direction of movement of the image bearer is in the transfer nip, the inter-sheet area positioned between a preceding recording sheet and a subsequent sheet; and
    c) the timing is the pre-entry timing,
    the cam is set at the second rotation stop position to separate the nip forming body from the image bearer and the electric current is set greater than the electric current at the sheet main portion entry timing.

15. The image forming apparatus according to claim 10, further comprising:
    a processor configured to acquire thickness information of the recording sheet,
    wherein the rotation stop position of the cam at the pre-entry timing is changed according the thickness information to change the distance between the nip forming body and the image bearer corresponding to the thickness information.

16. The image forming apparatus according to claim 15, wherein the electric current is reduced as a radius of curvature of a contact portion of the non-concentric curved portion decreases, the contact portion being in contact with the displacement body.

17. The image forming apparatus according to claim 6, further comprising:
    a controller configured to control the electric current such that the electric current at the first rotation stop position is less than the electric current at the second rotation stop position.

* * * * *